No. 742,570.

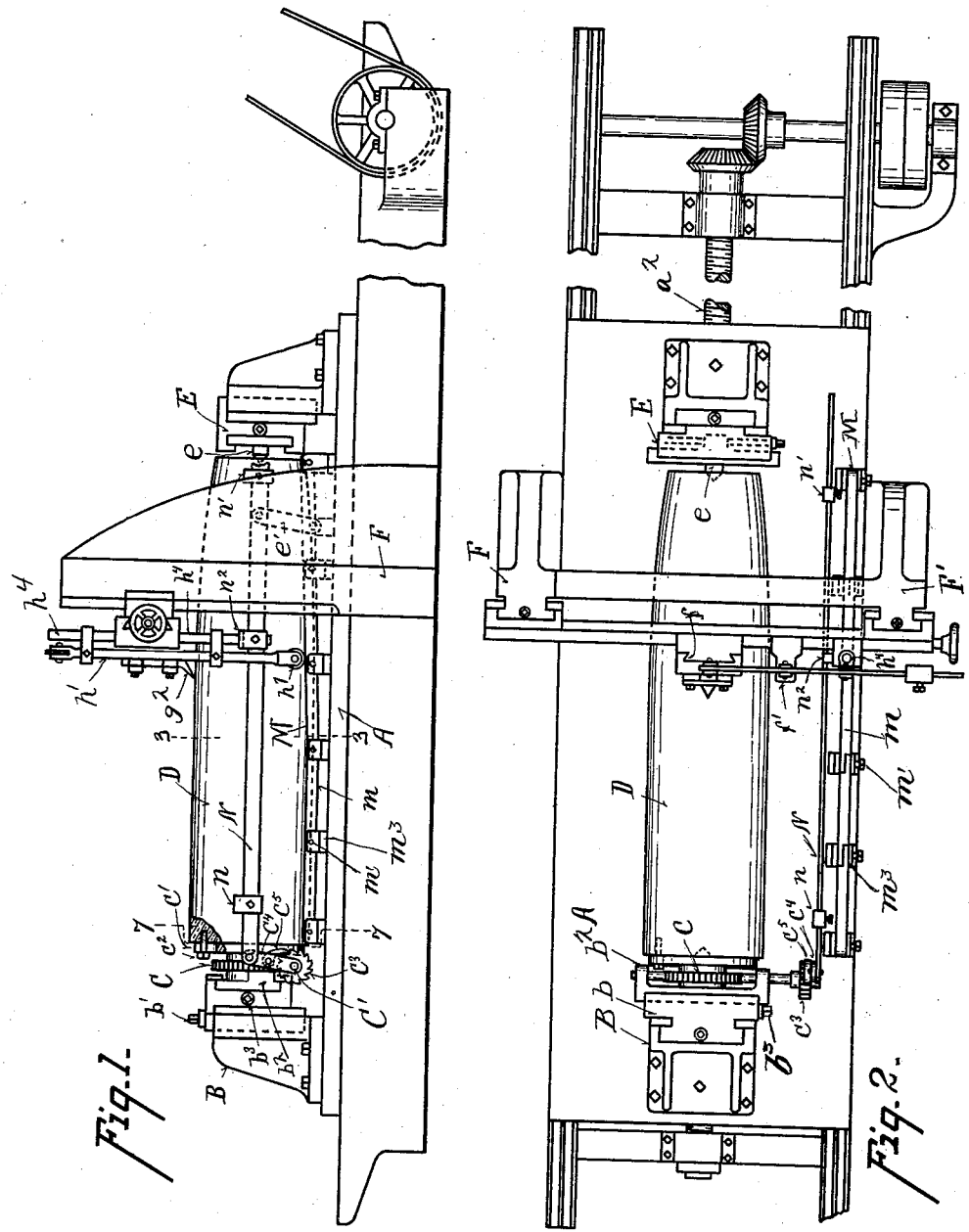

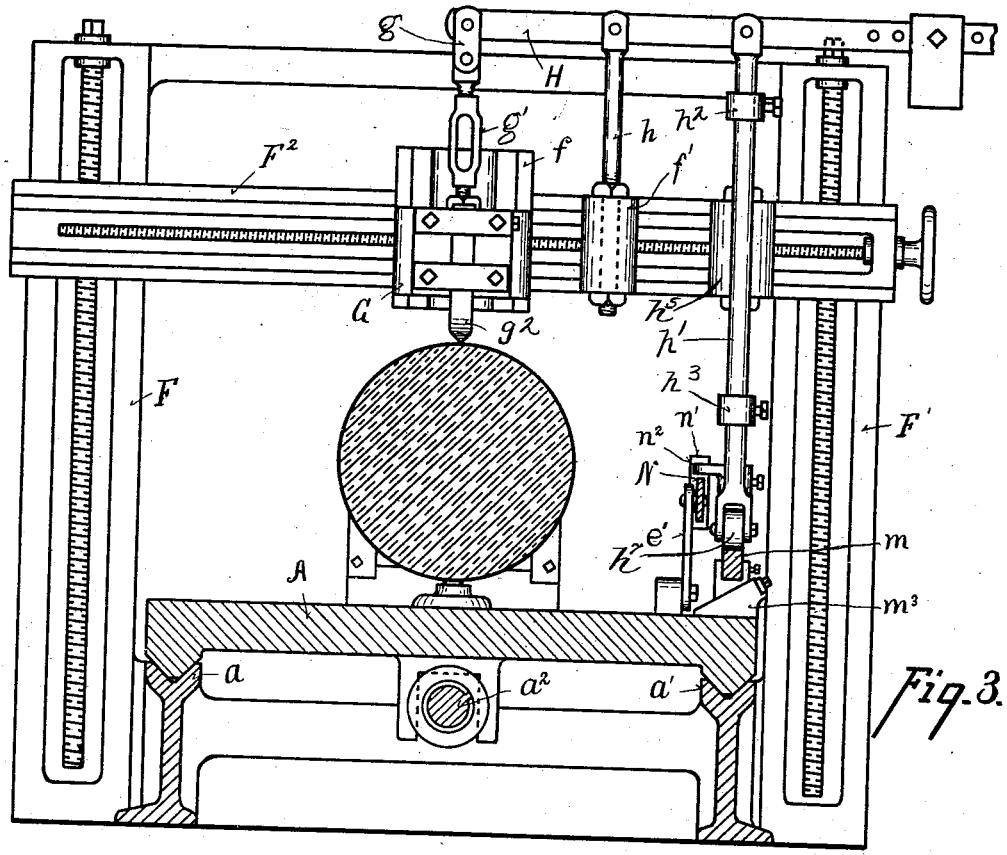
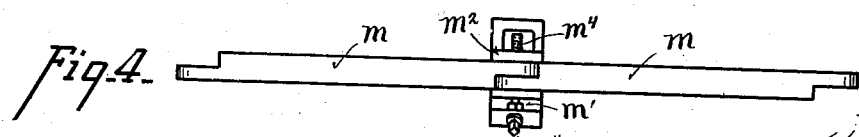
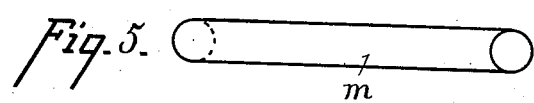
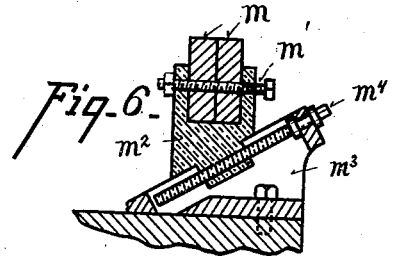

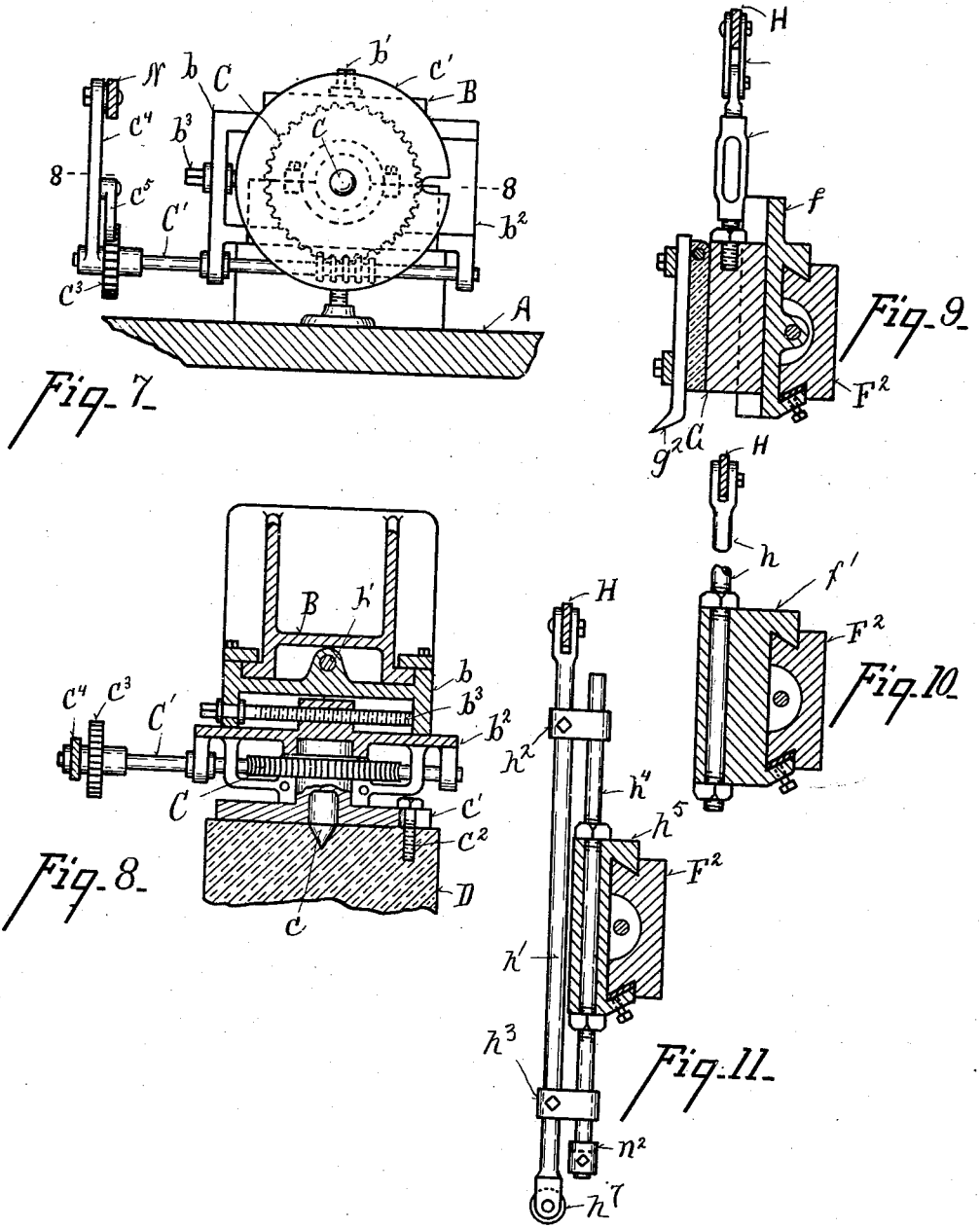

Patented October 27, 1903.

UNITED STATES PATENT OFFICE.

GEORGE BLEH, OF CINCINNATI, OHIO.

MACHINE FOR CUTTING STONE COLUMNS.

SPECIFICATION forming part of Letters Patent No. 742,570, dated October 27, 1903.

Application filed March 31, 1902. Serial No. 100,695. (No model.)

*To all whom it may concern:*

Be it known that I, GEORGE BLEH, a citizen of the United States of America, and a resident of Cincinnati, in the county of Hamilton and State of Ohio, have invented certain new and useful Improvements in Machines for Cutting Stone Columns, of which the following is a specification.

The object of my invention is a machine for automatically cutting columns from blocks of stone. This object is attained by the means described in the specification and illustrated in the accompanying drawings, in which—

Figure 1 is a side elevation of a machine embodying my invention. Fig. 2 is a plan view of the same. Fig. 3 is a transverse sectional view upon line 3 3, Fig. 1, upon an enlarged scale. Fig. 4 is a detail plan of a portion of the track or pattern. Fig. 5 is a detail side elevation of one section of the same. Fig. 6 is a detail cross-section of the track. Fig. 7 is a cross-section taken upon line 7 7 of Fig. 1 upon an enlarged scale. Fig. 8 is a horizontal sectional view upon line 8 8 of Fig. 7. Fig. 9 is a vertical central sectional view of the tool-stock and cross-rail. Fig. 10 is a similar view of the link connecting the tool-stock to the rocking bar. Fig. 11 is a similar view of the sliding rod which actuates the rocking bar.

Referring to the parts, table A is reciprocated upon longitudinal ways $a\ a'$ by a longitudinal feed-screw $a^2$ in the same manner as in planing-machines in common use. Centrally mounted upon table A are head and tail stocks B and E, respectively. Mounted upon the head-stock is a movable slide $b$, which may be moved vertically by means of a vertical screw $b'$. Mounted upon transverse horizontal ways in slide $b$ is a second slide $b^2$, to which a transverse motion may be imparted by means of a feed-screw $b^3$. Rotatably mounted in slide $b^2$ is a toothed wheel C, which has formed integral with it a spindle $c$ and a face-plate $c'$ and which meshes with a transverse worm $C'$. Face-plate $c'$ has a radial notch in it into which fits a pin $c^2$, which, together with spindle $c$, which enters the central point of the base or bottom of stone D, holds the stone to be operated upon firmly to face-plate $c'$, the other end or top of the stone being supported by a dead-spindle $e$ in the tail-stock, which enters the top of stone D at its central point. The tail-stock center is vertically and laterally adjustable in a similar manner to the head-stock.

Mounted at the sides of ways $a\ a'$ are standards F F', which support a cross-rail $F^2$, upon which are formed vertical ways $f$, upon which tool-stock G, which carries knife $g^2$, may slide in a vertical direction.

Mounted in block $f'$, which is clamped to cross-rail $F^2$, is a rigid fulcrum-rod $h$, upon which is pivoted a rocking bar H, which at one end is coupled to tool-stock G by a link $g$, the length of which may be regulated by a turnbuckle $g'$, and at the other end is pivoted to sliding rod $h'$, which slides in blocks $h^2\ h^3$ upon guide-rod $h^4$, which is secured to cross-rail $F^2$ by block $h^5$. Rod $h'$ carries at its lower end a wheel $h^7$, which moves upon track or templet M, which is secured to table A. A weight on the lever H serves to hold the roll $h^7$ on the templet M. Templet M is made up of sections $m$, mounted at their meeting ends upon a clamping-bolt $m'$ in blocks $m^2$, which are beveled upon their bases and mounted upon wedge-shaped blocks $m^3$, secured to table A. Blocks $m^3$ carry screws $m^4$, which engage blocks $m^2$ and by which said blocks may be raised or lowered upon blocks $m^3$, so that by this means and by means of bolts $m'$ the templet may be made of the form desired. In the form illustrated in the drawings, the smaller end or top of the column being that supported by tail-stock E, the templet M is highest at the end opposite the tail-stock, and thence grows less in height toward the head-stock, so that as the table advances knife $g^2$ is drawn upward. While the table is moving forward beneath the knife, the face-plate is fixed from rotating, so that the knife follows a longitudinal line down the column and cuts a groove in the stone similar to the templet. At the next forward movement of the table the knife will cut a similar path or groove adjacent to the aforesaid groove, and so on for each successive operation until the entire exterior of the stone has been thus cut. The means for automatically revolving the stone after the completion of one groove for making the next one will now be described.

Secured upon the end of worm-shaft $C'$ is a toothed wheel $c^3$ and a lever $c^4$, upon which a pawl $c^5$ is pivoted to engage wheel $c^3$. A similar lever $e'$ is pivoted upon a lug upon table A near the side of tail-stock E, and the two levers are joined by a longitudinal rod N. Two collars $n$ $n'$ are fixed upon rod N upon opposite sides of guide-rod $h^4$, and upon the guide-rod a finger $n^2$ is fixed to contact the collars, which are adjusted upon the rod in position such that just before the table reaches the forward limit of its travel collar $n$ contacts finger $n^2$, which throws the levers backward, so that pawl $c^5$ gets a new bite upon wheel $c^3$ and that upon the return of the table just before it reaches the limit of its travel collar $n'$ contacts finger $n^2$, moves the levers forward, rotates worm C', and thereby revolves face-plate $c'$ and column D to a new position beneath the knife, the degree of such rotation being regulated by the position of the collars upon rod N.

When it is desired to cut flutes in a column, as knife $g$ is made to travel over the same path several times, collars $n$ $n'$ are moved out of the reach of finger $n^2$. Flutes in a column become broader toward the base of the column. The cutting of them in this shape is accomplished by moving frame $b^2$ transversely by means of feed-screw $b^3$, thus causing the knife on its successive strokes to diverge from its first path toward the base, so as to broaden the flutes.

What I claim is—

1. In a machine for cutting stone the combination of a table, means for reciprocating the table, means for holding the stone thereon, a templet secured upon the table, a stationary frame above the table, ways formed upon the frame, a tool-stock sliding in the ways, a rocking lever pivoted on the frame, a rod sliding upon the frame and contacting with the templet, means for connecting the rocking bar at one end to the tool-stock and at the other end to the sliding rod and means for automatically rotating the stone after each forward movement of the table, substantially as shown and described.

2. In a machine for cutting stone the combination of a reciprocating table, means for reciprocating the table, a head and a tail stock mounted upon the table, a slide mounted in the head-stock and capable of a transverse motion thereon, a face-plate mounted in the slide, a templet secured upon the table, a stationary frame above the table, ways formed upon the stationary frame, a tool-stock sliding in the ways, a rocking lever pivoted on the frame, a rod sliding upon the frame and contacting with the templet, and means for connecting the rocking bar at one end to the tool-stock and at the other to the sliding rod, substantially as shown and described.

3. In a machine for cutting stone the combination of a table, means for reciprocating the table, means for holding the stone thereon, a templet consisting of sections secured at their ends by clamping-bolts and mounted on bevel-blocks, standards secured upon the table and having screws for engaging the bevel-blocks, a stationary frame above the table, ways formed upon the frame, a tool-stock sliding in the ways, a rocking lever pivoted on the frame, a rod sliding upon the frame and contacting with the templet, and means for connecting the rocking bar at one end to the tool-stock and at the other to the sliding rod, substantially as shown and described.

GEORGE BLEH.

Witnesses:
W. F. MURRAY,
EMMA LYFORD.